Sept. 14, 1965     E. O. GUERNSEY     3,206,365
PRODUCTION OF HEAVY WATER
Filed Feb. 8, 1963     3 Sheets-Sheet 2

INVENTOR.
EDWIN O. GUERNSEY
BY A. H. Caser
ATTORNEY

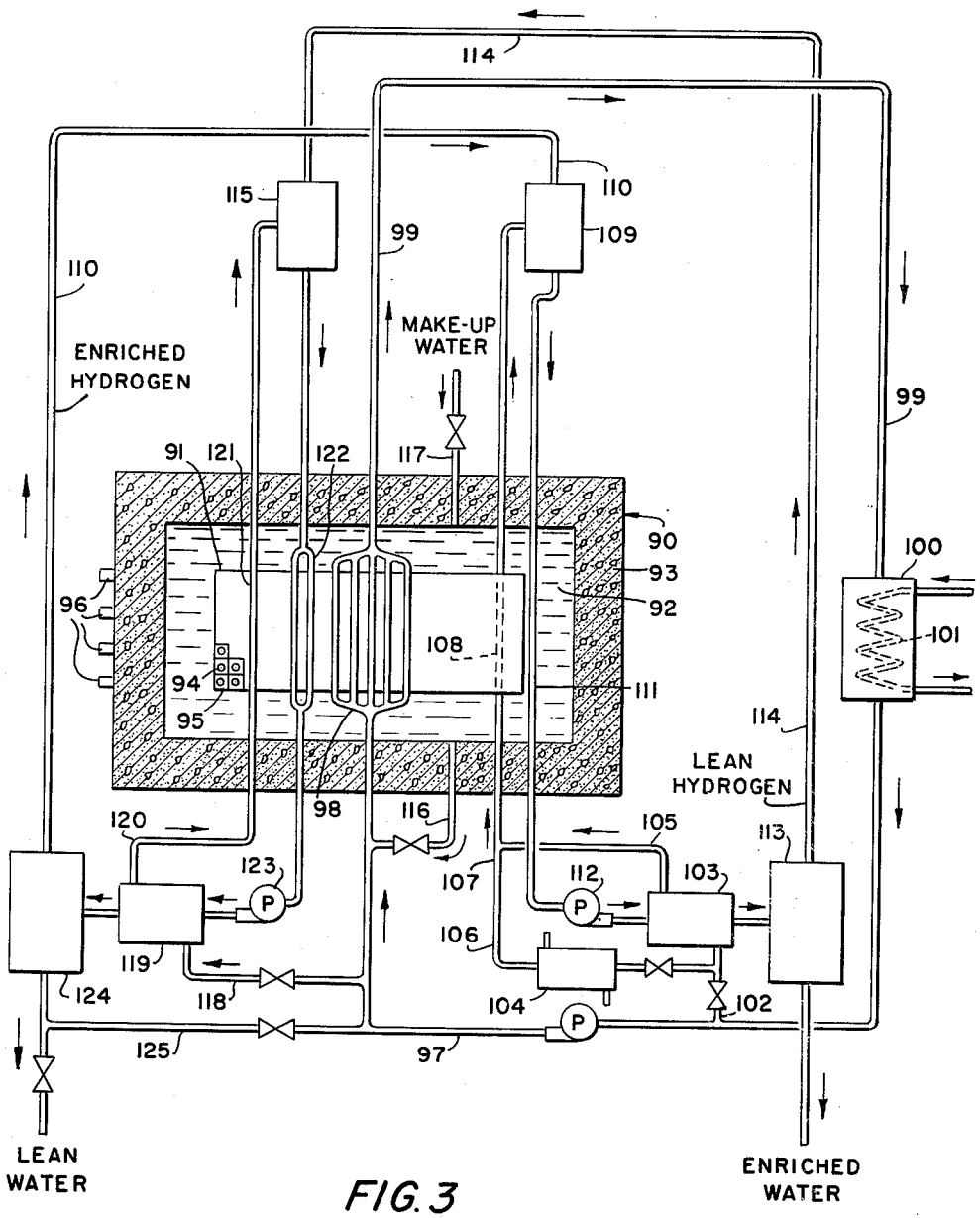

3,206,365
PRODUCTION OF HEAVY WATER
Edwin Owens Guernsey, Pennington, N.J., assignor to Socony Mobil Oil Company, Inc., a corporation of New York
Filed Feb. 8, 1963, Ser. No. 257,206
11 Claims. (Cl. 176—14)

This invention relates to a process for the production of heavy water.

As is known, heavy water is a valuable moderator in nuclear reactors. Considered purely as a moderator, it is one of the best materials currently to be found. It is prepared in various ways by separation from natural or light water, in which it is present in a concentration of 140 to 150 p.p.m., and although a considerable amount of work has been done to develop methods for its production, it still remains in short supply. A principal object of the invention is to provide a method for producing heavy water in improved yields, using a chemical exchange reaction of the type $$H_2O + HD \rightleftharpoons HDO + H_2$$

The reaction is carried out in the gaseous phase. At equilibrium, the ratio of deuterium to hydrogen in the steam components ($H_2O + HDO$) is different from the ratio in the gas components ($H_2 + HD$). By contacting the steam components with the gas components, a separation of deuterium from hydrogen may be made.

More particularly, the invention involves the dependence on temperature of the chemical exchange reaction, and comprises passing hydrogen gas through two catalytic exchange reactors in series, one reactor being maintained at low temperature and the other at high temperature. As is known, in such a dual temperature method, the equilibrium constant of the reaction is approximately 2.8 to 2.6 at low temperatures (about 75 to 100° C.) and approximately 1.39 to 1.3 at high temperatures (about 500 to 600° C. Thus production of deuterium-enriched steam (HDO) is favored at low temperatures, the deuterium being transferred from the hydrogen to the steam; while at high temperatures and at lower values of the equilibrium constant, the reaction proceeds in the opposite direction, deuterium being transferred from steam to hydrogen and deuterium-enriched hydrogen (HD) being produced. As indicated, catalysts are used, for otherwise equilibrium is established slowly.

According to the present method, it is proposed to carry out the catalytic exchange reactions, in both the low and high temperature zones, in the presence of fissionable material suitably mixed with the catalyst, and to induce fission of such material during contact of the reactants therewith. The amount of fissionable material in the contact mass is such as, under suitable conditions, to permit either a neutron-multiplying fission reaction, or a self-sustaining neutron-multiplying fission reaction, to take place. In either case, a neutron flux is maintained in the contact mass; in the first case, the mass is sub-critical, and the neutron flux is supplied from outside the mass and may be controlled and moderated within and/or outside the mass; in the second case, the mass is critical or above critical, and the neutron flux is self-generated and controlled and moderated within the mass.

A number of advantages are thus provided. The fission reaction releases energy in the form of heat, high energy fission fragments, neutrons, gamma radiation, etc., and such energy is of value in the catalytic exchange reactions. The heat energy is useful to heat and vaporize the feed water, to superheat the resulting steam, and to attain desired reaction temperatures. The high energy fission fragments and the radiation, including the neutrons, increase the chemical activity of the catalysts in a number of ways, including the inducement of radioactivity in the catalysts, and improve their ability to influence the hydrogen-deuterium exchange; the fission fragments and radiation also transfer their energy directly to the reactants, or indirectly thereto as by creating high energy sites or excitation centers on the contact material which in turn transfer energy to the reactants. In particular, the neutrons generated by the fission reaction may be captured by hydrogen nuclei in the water, steam, and hydrogen reactants, forming deuterium, and thus increasing the level of concentration of this material in the reaction system, with the result that increased amounts of deuterium are recovered in the heavy water product.

The invention may be better understood by referring to the accompanying drawings, all of which are diagrammatic, in which flow systems are shown and in which:

FIG. 3 also illustrates a dual-temperature method in which a nuclear power reactor forms a part of the system.

Figure 1:
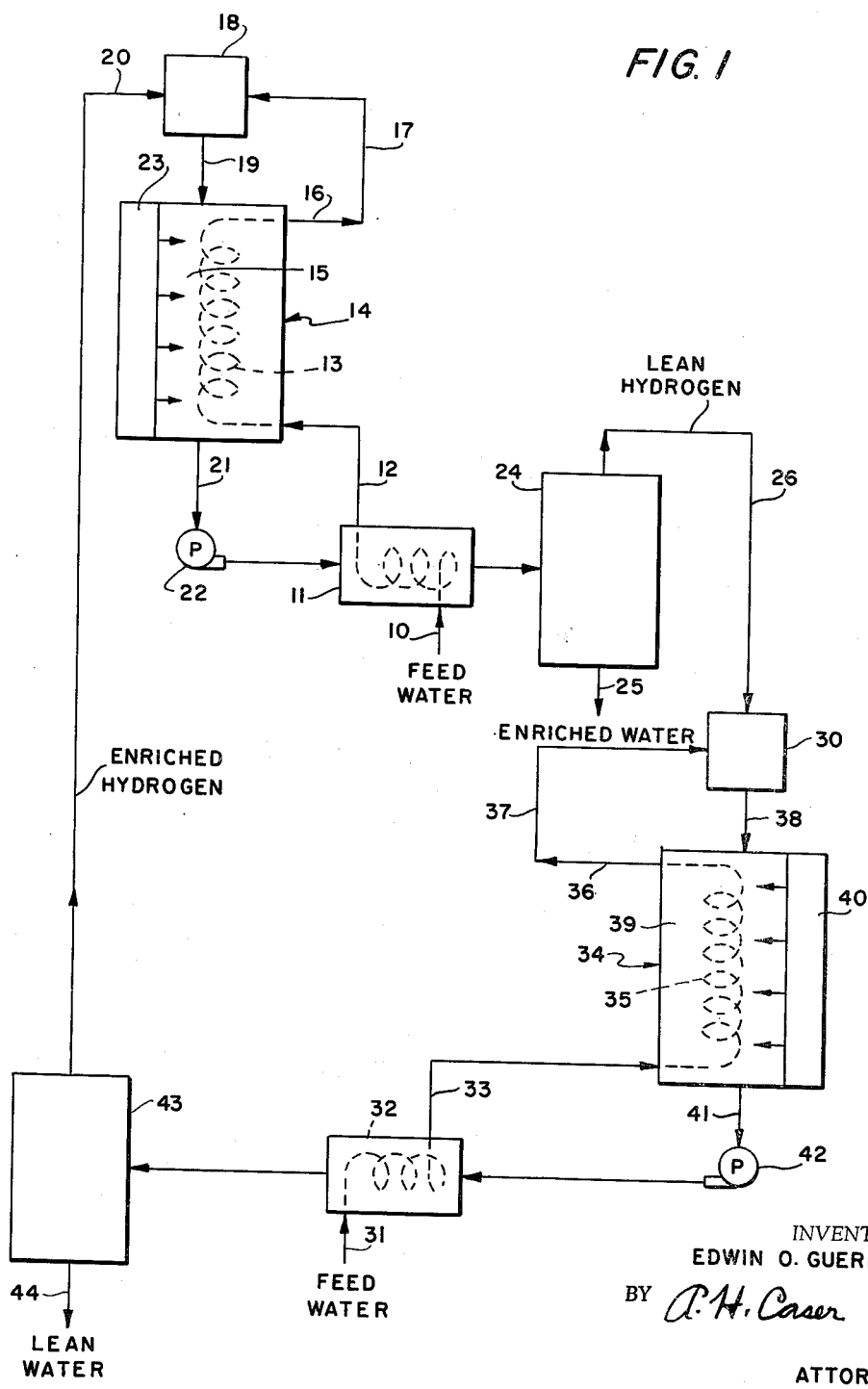
FIG. 1 illustrates a dual-temperature method in which catalytic exchange reactions are carried out in the presence of a sub-critical mass of fissionable material.

In FIG. 1 natural water enters the flow system at 10, is preheated in the heat exchanger 11, and then passed by line 12 to a coil 13 in the low temperature exchange reactor 14. The water is heated and vaporized in the coil, in the manner noted below, and the resulting steam passes through lines 16 and 17 to mixing zone 18. The coil is suitably constructed of a material which is a poor neutron absorber, such as aluminum.

Hydrogen gas (enriched in deuterium) enters the mixing zone 18 through line 20, is thoroughly mixed with the steam, and the resulting reactant mixture, by action of pump 22 in outlet line 21, passes downwardly in line 19 and through contact mass 15 containing the exchange catalyst as well as fissionable material. A source of neutrons is indicated at 23, the intensity of which is sufficient to induce fission of the fissionable material to produce heat, fission fragments, neutrons, and gamma radiation. The fission reaction is a neutron-multiplying one but, owing to the sub-critical amount of fissionable material present, is not a self-sustaining reaction. The heat produced by the reaction is useful to heat and vaporize the water in coil 13. During passage of the feed water and steam upwardly in coil 13, absorption of neutrons by the hydrogen component thereof occurs with formation of deuterium, thus enriching the feed. Deuterium enrichment of the downwardly-flowing steam and hydrogen also takes place by neutron capture, and in the exchange reaction, deuterium is transferred from the hydrogen to the steam. As indicated, exposure of the catalyst to the nuclear radiation and fission fragments is considered to result in an enhanced catalytic activity, or in the creation of high energy sites or excitation centers in the catalyst, or in both effects, and in consequence the rate of exchange of deuterium from hydrogen to steam is improved. In some cases, energy transfer, at least in part, may be direct, the high energy fission fragments and the radiation transferring energy directly to the reactants by contact therewith.

It will be understood that neutron source 23 may be of any suitable kind, suitably located relatively to the contact mass 15, and that both such source and the contact mass will be enclosed by appropriate shielding.

Pump 22 draws the reaction mixture out of the exchange reactor, passing it to the heat exchanger 11 where it is cooled to condense the steam and thence to separator 24 where deuterium-enriched water is separated from deuterium-depleted hydrogen gas and recovered through line 25. The lean hydrogen is sent by line 26 to the mixing zone 30 of the high temperature exchange reactor 34. In reactor 34, fresh feed water from line 31, suitably preheated in heat exchanger 32, and desirably vaporized, is introduced by line 33 and flows upwardly in the coil 35 where it is superheated, and then passes by lines 36 and 37 into mixing zone 30 where it is commingled with lean hydrogen, as described. This reactant mixture is then drawn by pump 42 downwardly through line 38, into reactor 34, and through the contact mass 39 comprising exchange catalyst and fissionable material. Neutron source 40 supplies neutrons to induce a neutron-multiplying but not a self-sustaining chain reaction in the mass 39. Catalytic exchange occurs, deuterium being transferred from the steam to the hydrogen. The beneficial effects of the fission heat, fission fragments, and nuclear radiation, as described above, are also obtained in this exchange zone, with the result of increased enrichment of the hydrogen. The reaction mixture leaves the contact mass through line 41 and is passed by pump 42 through heat exchanger 32 to separator 43 where a lean or depleted water fraction is removed by line 44 and discarded, and a deuterium-enriched hydrogen fraction is separated and sent by line 20 to the mixing zone 18 of reactor 14.

It will be understood that suitable means (not shown) will be used to deliver the hydrogen to zone 18 (and also to zone 30) at a desired pressure. Mixing zones 18 and 30 may also be provided with suitable temperature adjusting means to add heat to or remove heat from the gaseous mixtures, as may be desired.

As is apparent, the hydrogen flows in a closed cycle and acts as a deuterium-transferring medium, while the water feed constitutes the source of the deuterium, being supplemented in this respect by neutron capture in hydrogen.

The temperatures in reactors 14 and 34 are conventional; for example, 100 to 140° C. in the low temperature reactor and 500 to 600° C. in the high temperature one. It is to be noted in this connection that the irradiation of the catalyst which occurs may increase its chemical activity to an extent as to permit use of a lower reaction temperature, a factor of importance especially in regard to the low temperature reactor where the equilibrium constant for the exchange reaction (equation noted above) increases as the equilibrium temperature decreases. Thus, at 140° C. the equilibrium constant is about 2.20, at 125° C. it is about 2.43, and at 100° C. it is about 2.63. In the case of the high temperature reactor also, a lower reaction temperature may maintain a desired reaction rate; however, it may be preferable to keep the temperature as high as possible for the sake of speeding up the reaction and to extend the equilibrium limit for the back reaction. A faster reaction means a faster throughput, and in turn may permit a reduction in size of the equipment, which is definitely an advantage.

Pressures in reactors 14 and 34 are conventional. Both may be at atmospheric pressure; or if desired, the hot reactor may be operated at higher pressure than the lower. For example, the cold reactor may be held at 1 to 30 atmospheres, and the hot at about 30 to 200 atmospheres.

Additional heating means may be provided, if desired, for the feed water going to reactors 14 and 34, and additional cooling means may also be supplied for the reactor effluents.

It will be understood that both reactors 14 and 34 are positioned in operative relationship with respect to the neutron sources 23 and 40, and that the neutron flux from these sources is of sufficient density to initiate and maintain a neutron-multiplying fission reaction. These sources may be an accelerator, a mixture of radium and beryllium, or a nuclear reactor. The extent of fissioning that is permitted in contact masses 15 and 39 is at least sufficient to supply the energy desired to effect the changes desired, i.e., increase the catalytic activity, create excitation centers or sites on the contact mass, influence the exchange reactions by means of the high energy fission fragments, provide neutrons to increase the deuterium content in the reactants by neutron capture, and provide heat for vaporizing the feed water and/or superheating the resulting steam. The extent of fission depends on the amount of fissionable material, which will be present in an amount to secure a neutron-multiplying but not a self-sustaining reaction and will be appropriately distributed through the mass to obtain such a result. The fissionable material contained in the contact mass may be uranium-235, uranium-233 and/or plutonium-239, either in elemental form or in the form of compounds like the oxide or carbide. If natural uranium is employed, appropriate enrichment of the same with uranium-235 is preferably made so that the amount of the latter is about 4 to 90% or more of the total uranium. In this connection, "fissionable material," as used herein, means those materials which undergo nuclear fission as a result of the absorption of thermal or fast neutrons.

The mixture of fissionable material and catalyst, which forms the contact mass, may have various forms, all of which should be porous to permit access by the gaseous reactants. Preferably these forms are microporous and have a surface area of 5 to 1500 square meters per gram. In one form, the mixture may comprise an intimate blend of powdered fissionable material, say of up to 6 microns grain size, preferably up to 1 or 2 microns, and catalyst particles, the latter being of the same size or larger. With this form all of the various kinds of fission energy are available to the catalyst and reactants, particularly the recoil energy of the fission fragments, the latter accounting for a large part of the total energy.

A second form of mixture comprises microporous pellets, beads, tablets, extrusions, or other formed shapes, suitably of about 150 microns to one inch nominal diameter, each made up of catalyst and fissionable material. This form also makes available to the catalyst and reactants its entire energy. By suitable sizing and shaping of the structures, or by forming them with an outer catalyst shell which is kept free of fissionable material, it may be possible to substantially retain the heavy fission fragments within the confines of the structures and thus reduce contamination by radioactive fragments. However, it is to be noted in this connection that because the reaction proceeds in the gas phase, contamination of the reactants and products is not as serious a problem as if the exposures were made in the liquid phase.

In a third form, both components of the mixture may each be granular, prepared simply by mixing granular catalyst with granular fissionable material, with the latter of such size that recoil fission fragments are confined substantially to the granular material and are not generally available to the surrounding environment.

In another form of mixture, conventional cladded fuel elements, such as aluminum-cladded elements, may be disposed alongside the catalyst, the latter having a form and shape similar to the fuel elements. A large number of such formed structures, suitably intermixed, may thus make up the contact mass. Heat, neutrons, and gamma radiation energy from the fission reaction will be available to the environment, but the fission fragments will be retained in the fuel elements by the cladding.

The catalysts for the exchange reactions are conventional and include Raney nickel, also iron or cobalt in Raney form, platinum on an alumina or activated carbon carrier, nickel on alumina or chromia, etc. These catalysts, which will be recognized as solid hydrogenation catalysts, are available in powdered or granular form, and also may be formed into bodies such as rods, discs, and the like.

Figure 2:
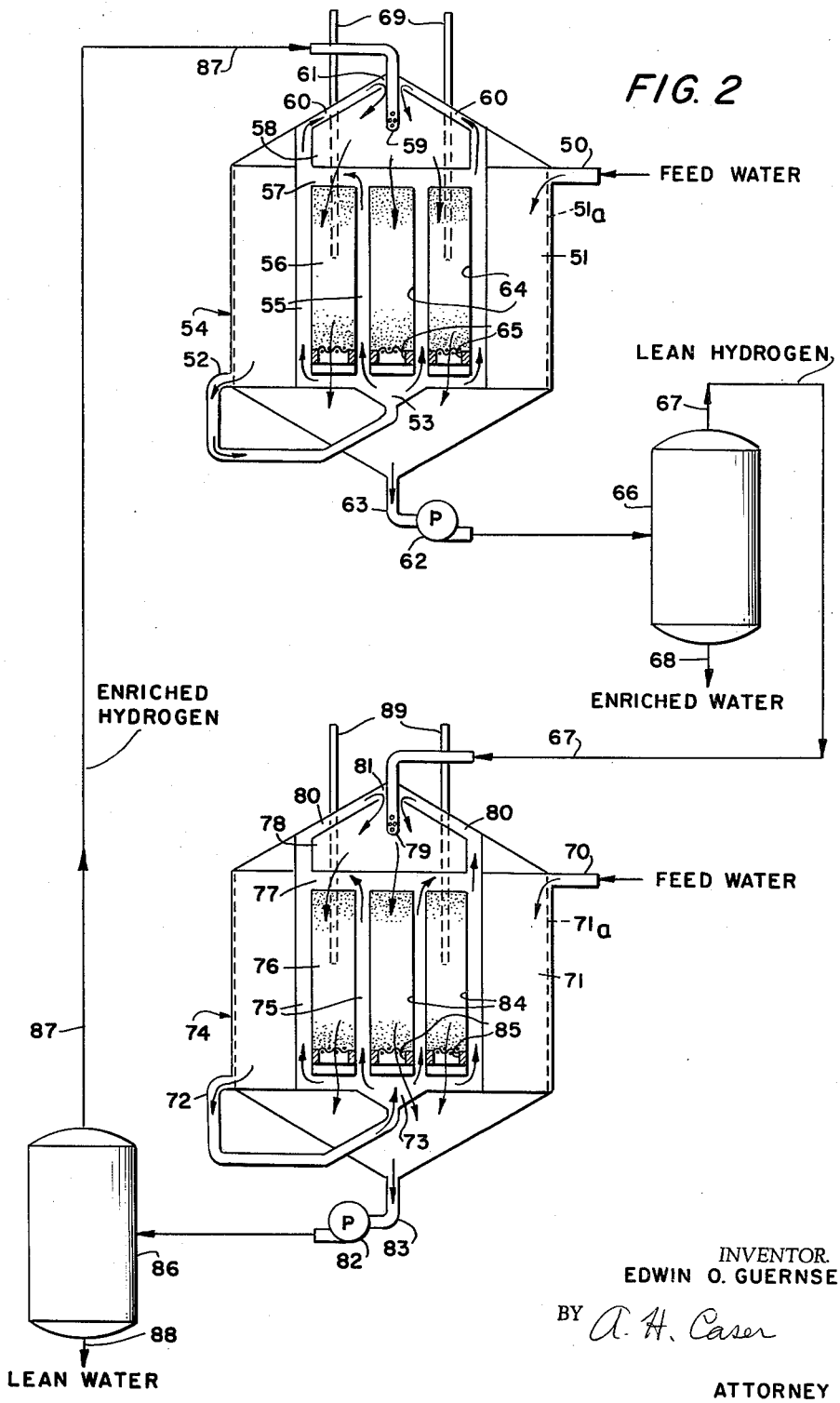
FIG. 2 illustrates a dual-temperature method using a critical or above critical mass of fissionable material and in which a part of the detail is omitted.

In FIG. 2, the fissionable material-containing contact mass 56 is critical or above critical and may therefore comprise the core of a nuclear or chemonuclear reactor, which is diagrammatically shown at 54. Natural water entering the system through pipe 50 flows through an annular zone 51 which surrounds the inner portion or core 55–56 of the reactor 54. In zone 51 the water constitutes a blanket for the fission reaction which takes place in contact mass 56, serving to reflect neutrons into the contact mass or core, although some are also absorbed to form heavy water. The thus-enriched water leaves blanket 51 by line 52 and flows through lower header 53 into the tubes 55 where it is vaporized by the aid of fission heat, and the resulting steam leaves the tubes through upper header 57. Deuterium enrichment of the water and steam takes place by neutron capture in tubes 55. The steam flows in the annular passage 60 and then through outlet 61 into mixing zone 58 where it is commingled with hydrogen entering the zone through the perforated end 59 of pipe 87; the resulting mixture flows downwardly in the reactor through the contact mass 56 disposed in the spaces 64. Further deuterium enrichment of the steam and hydrogen occurs by neutron capture, and catalytic exchange of deuterium from the hydrogen to the steam takes place in the contact mass. The reaction mixture exits from the contact mass through screened openings 65 and is passed by line 63 and pump 62 into the separator 66. Suitable cooling means (not shown) may be placed in line 63, such as a heat exchanger which may also serve to initially heat the feed water before it enters line 50. The cooled mixture is separated in 66, giving a deuterium-enriched water fraction, which is removed through line 68 and recovered as the product, and a lean hydrogen fraction which is sent by line 67 to the mixing zone 78 of the reactor 74.

Control rods 69 of suitable neutron-absorbing material like cadmium or boron are movably disposed in the contact mass 56 and operate conventionally, that is, when drawn up they allow the fission reaction to proceed, and when moved downwardly they act to stop the reaction. The water and/or steam flowing in tubes 55, together with the steam and hydrogen flowing in spaces 64, act as moderators of the fission reaction; their effect in this respect may be supplemented by incorporation in the contact mass of moderator material such as carbon, beryllium, beryllium oxide and the like.

It may be stated in this connection that the construction and operation of nuclear reactors are conventional and are described, for example, in Elements of Nuclear Reactor Physics by Edlund and Glasstone, and in Principles of Nuclear Reactor Engineering by Glasstone.

The operation of reactor 74 is similar to that of reactor 54. Fresh feed water enters pipe 70 of blanket 71 of the reactor, becomes enriched in deuterium by neutron capture, and flows via pipe 72 into lower header 73, thence through tubes 75 to upper header 77. Heat is supplied to the water by the fission reaction, and any additional heat may be added by means not shown at any suitable point prior to entrance of the water into the tubes. Steam enters the mixing zone 78 through passages 80 and outlet 81, is mixed with lean hydrogen gas delivered through line 67, and the resulting mixture is drawn downwardly through contact mass 76 by pump 82. Neutron capture takes place during the upward passage of the water and steam and during the downward passage of the hydrogen and steam, and under influence of the catalyst, deuterium exchange from the steam to the hydrogen proceeds.

The gaseous reaction mixture flows out of reactor 74 through line 83 and pump 82, is suitably cooled by means not shown to condense the steam, and is separated in zone 86 into an enriched hydrogen fraction and a lean water fraction, the former being passed by line 87 to the mixing zone 58 of reactor 54, and the latter being discarded through line 88.

As will be understood, in both reactors 54 and 74 the energy of the fission reaction increases the chemical activity of the catalyst and/or promotes energy transfer by the creation of excitation centers in the contact mass.

Control rods 89 are provided for reactor 74, their function being the same as rods 69. If desired, a neutron reflector of conventional reflector material such as graphite, beryllium, or beryllium oxide, may be used in each reactor in the form of the annular layers or walls 51a and 71a of suitable thickness. These layers may be disposed just inside the annular walls of the reactors 54 and 74, or may comprise such walls. Biological shields (not shown) of concrete or other suitable materials will be provided for the reactors, as will be understood.

It may be noted that the hydrogen gas used in the process may be from any suitable source, preferably a relatively low pressure source such as the electrolysis of water.

Cascade operation is practical and feasible. According to this procedure, a plurality of stages are connected, considering one stage to comprise the low and high temperature exchange reactors together with associated equipment.

In FIG. 3 a selected embodiment of the invention is shown in connection with the operation of a conventional nuclear power reactor. The reactor, designated as 90, is shown in diagrammatic form as comprising a core 91 surrounded by a reflector 92 comprising water which in turn is surrounded by a concrete shield 93. Fuel for the reactor is shown in part in the form of rods 94 of natural uranium imbedded in conventional graphite blocks 95 which act as moderator. It will be understood that other conventional fuels and moderators are suitable. Control rods 96 of conventional material are shown in part, it being understood that these extend into the core and operate in the usual manner. Coolant in the form of natural water flowing in line 97 enters the reactor and flows through the core in a plurality of tubes 98, leaving the reactor through line 99 in the form of superheated steam which is passed through the heat exchanger 100 where the steam gives up heat to a working fluid such as water flowing through the coil 101. The steam formed in coil 101 is removed to operate a turbine, as is conventional. Coolant leaving exchanger 100 is returned to the reactor; this coolant may be in the form of low temperature steam, or it may be condensed, depending on the extent of heat removal in coil 101, which will be understood to be variable.

According to the invention, a portion of the fluid in the power loop 97–99, which is enriched in deuterium owing to its constant exposure to and absorption of neutrons, may be removed through line 102 and sent to the low temperature catalytic exchange reactor. If the temperature of the fluid in line 102 is too low, it may be adjusted by passing the fluid through heat exchanger 103 after which it is sent by line 105 to line 107. If the temperature of the fluid in line 102 is higher than desired, it is appropriately cooled in the heat exchanger 104, where the heat is recovered, and the fluid sent by line 106 to line 107. As will be apparent, a part of the fluid may be sent through both heat exchangers for greater control of the temperature. The fluid in line 107 flows through tube 108 disposed in the reactor core where it is exposed to a high neutron flux, thus favoring the formation of heavy water. The fluid then enters the mixing zone 109 where it is mixed with deuterium-enriched hydrogen from line 110 and the mixture is delivered to the low temperature catalytic reaction zone 111 comprising one or more tubes containing exchange catalyst and fissionable material. The tubes are disposed in the reflector at the outer surface of the reactor core in order to avoid excessive heat pick-up; if desired, they may be placed farther away from the core and nearer to the shield, or even in the shield. If necessary, disposition of the tubes in the core is also possible but believed less preferable. It will be understood that the action in zone 111 is substantially as described for zone 54 of FIG. 2. The mixture of steam and hydrogen is withdrawn from zone 111 by pump 112, passed through heat exchanger 103 and into separator 113 where heavy water product is removed as indicated and gaseous hydrogen lean in deuterium is sent through line 114 to the mixer 115.

Make-up water may be added to the loop 97–99 by withdrawing deuterium-rich water from the reflector 92, this water being withdrawn through line 116. Make-up water for the reflector may be added through line 117. It will thus be seen that the make-up water for the loop is initially enriched in deuterium in view of its previous use as the reflector.

Another portion of water (or steam) is diverted from the loop through line 118, heated in the heat exchanger 119, passed by line 120 into and through tube 121 in the reactor core where it absorbs neutrons and heat, and is then sent to mixer 115 for mixing with the hydrogen from separator 113. The resulting mixture is delivered to the high temperature catalytic exchange reactor 122 disposed in the reactor core where the action is similar to that described for the high temperature zone of FIG. 2. It will be noted that the reactor 122, which may comprise a group of two or more tubes containing catalyst and fissionable material, is more centrally located in the reactor core than, say, the low temperature reactor, the purpose being to favor a high heat pickup by reactor 122. The reaction mixture is withdrawn from zone 122 by pump 123, passed through heat exchanger 119 and into separator 124 where a deuterium-enriched hydrogen fraction is removed through line 110 and delivered to mixer 109 as described. The water fraction from separator 124 may be removed and discarded, or it may be passed through line 125 to the loop 97–99.

Tubes 108, 111, 121, and 122 may be constructed of materials like aluminum or zirconium which have a low neutron capture cross section. Tubes 98 may be of conventional metals like stainless steel or zirconium alloys. The tubes containing the fissionable material and catalyst, i.e., tubes 111 and 122, may also contain a moderator such as graphite; although it may be noted that the water or steam passing therethrough also acts as a moderator. If desired, fissionable material may be omitted from tubes 111, and in this case it may be desirable to locate these tubes slightly within the reactor core.

The number of tubes 108 may be the same as that of tubes 111; and it is possible to combine both sets of tubes as by making them concentric, each tube 111 being concentrically disposed within a tube 108 with an annular space formed between them. Fluid from line 107 may then flow upwardly in the annular space, and the steam-hydrogen mixture from mixer 109 may pass downwardly in the catalyst-containing central tube. This type of arrangement is also applicable to tubes 121 and 122 of the high temperature reactor.

As will be apparent, higher yields of heavy water are possible owing to the opportunities provided for neutron capture by the hydrogen nuclei of the water and steam with resultant formation of deuterium nuclei. Neutron capture by hydrogen of the hydrogen gas is also possible, but is of course greater by the greater number of hydrogen atoms in the water. In this connection, the process of FIG. 2 or 3 is particularly advantageous because of the possibility of neutron capture afforded by the water blanket and reflector, respectively. With a higher deuterium concentration in the starting feed water, and increasing as the feed moves along, it is apparent that for a given amount of heavy water production smaller amounts of water need be handled than otherwise, and equipment size may be reduced.

Increased production of heavy water is also brought about by improving the efficiency of the catalytic exchange reactions through irradiation of the catalyst. Activity of the catalyst is enhanced by the neutron and gamma radiation to which it is subjected and which it absorbs, and this enhanced activity is manifested by a more efficient conversion of the reactants. Although radiation-induced enhancement of catalytic activity has in the past been observed to decrease and disappear after cessation of the radiation and use of the catalyst at elevated temperatures, in the present case the irradiation of the catalyst takes place continuously throughout the course of the catalytic reactions such that the enhancement is not merely transitory.

Irradiation of the contact mass, especially where high surface areas are present, may also result in the creation of centers of excitation, either in the catalyst or in the carrier, and as a result the contact mass is able to transfer energy from these centers to the reactants and favorably influence the course of the reaction. Here, too, as the irradiation of the contact mass is continuous, a continuous effect is obtained.

Among other advantages, not least is the useful heat from the fission reaction that is made available for maintaining the reaction temperature, for heating and evaporating the feed water, and, in the high temperature zones, for superheating the steam. At the same time, it may be noted that the feed water that is heated also acts as a coolant for the fission reaction, so that this particular heat exchange step has a double advantage.

It will also be apparent that with water as the source of the deuterium, the production capacity of the process may be quite large. There is no consumption of hydrogen, except for losses, and it is not handled in liquid form which would require high pressure equipment. Furthermore, the process is not dependent on the formation of any other product than heavy water, so that neither its capacity nor its flexibility is limited in this way.

In a typical operation using a flow system as in FIG. 1, pure water of natural deuterium concentration is heated to a temperature of about 100° C. and then pumped into a low temperature catalytic exchange reactor in indirect heat exchange with a contact mass undergoing fission.

The contact mass comprises, as the exchange catalyst, nickel in Raney form disposed on a carrier of alumina; and, as the fissionable material, pelleted natural uranium dioxide enriched to an extent of up to about 5 to 10% by the addition of uranium-235 in the form of the dioxide (similar to uranium dioxide fuels prepared for use in power reactors). Enough fuel is included in this pellet form to allow fission to continue throughout the expected lifetime of the catalyst bed. The exchange catalyst and the uranium-containing pellets may simply be intimately mixed together.

Alternatively, the uranium dioxide may itself be supported on a carrier of large specific surface area, such as alumina, silica or activated carbon. For example, alumina may be contacted over a period of several hours with a concentrated solution of uranyl nitrate, then dried and heated at about 450 to 600° C. to decompose the nitrate. Following this impregnation, which may be repeated if desired, alumina particles are obtained containing up to as much as 35% by weight of uranium. This material in powdered form may be mixed with powdered exchange catalyst and the resulting mixture pressed into the form of microporous pellets having a nominal diameter of 1/8 to 1/4 inch, a surface area of about 300 square meters/gram and a pore volume of up to 35% of the total volume.

Fission of the uranium in the contact mass is induced by disposing the latter in operative relation to the core of an appropriate and adjacent nuclear reactor where it is subjected to a predetermined neutron flux at least equal to $10^{11}$, and preferably $10^{12}$, neutrons/sq. cm./sec. or more. Fission produces energy in the form of heat, fission fragments, neutrons and gamma radiation. As the heated feed water is pumped upwardly in heat exchange relation with the contact mass, the fission heat helps to vaporize the water to steam and/or to sustain the temperature thereof. The temperature of the contact mass is maintained sufficiently high to bring about the transfer of heat to the water under the prevailing pressure conditions by controlling the amount of uranium fission and by regulating the rate of flow and the temperature of the incoming water. Preferably the contact mass temperature is 120 to 130° C. The temperature of the contact mass would be greater than 130° C. were it not for the cooling action of the water as it vaporizes. At the conclusion of the upward pass the water, now completely vaporized to steam and enriched in deuterium content by neutral capture, is mixed with hydrogen gas in approximately equal volumes and then, under the influence of the pump in the outlet line leading from the reactor, the mixture is drawn back through the contact mass in direct contact therewith.

Following its downward pass through the low temperature reactor, the gaseous mixture is cooled to condense the steam, and the mixture is separated. The condensed fraction, comprising heavy water product, is recovered. The hydrogen gas fraction is passed to the gas mixing zone of a high temperature catalytic exchange reactor where it is mixed on an approximately equal volume basis with steam superheated to about 600° C., the latter resulting from vaporization of fresh natural feed water that has been suitably preheated and passed in indirect heat exchange with a contact mass similar to the preceding one but maintained at a higher temperature. This mass has a higher content of fissionable material so that the greater rate of fission (necessary to maintain temperatures of about 600° C.) may be continued throughout the operating lifetime of the catalyst. The hydrogen-steam mixture is passed through the contact mass in direct contact with the same, chemical exchange occurs, and then the mixture is drawn from the reactor, cooled, and the steam condensed. The condensed steam is lean with respect to deuterium and is discarded. The separated enriched hydrogen gas fraction is passed to the mixing zone of the low temperature reactor where its deuterium is transferred to steam. As noted, this enriched steam is condensed, separated, and removed; it is richer in deuterium not only by an amount dependent upon the equilibrium values related to the temperatures of operation of the hot and cold reactors, but also as the result of neutron captures by hydrogen nuclei.

Many of the advantages of the invention may be realized by employing fissionable material in the high temperature catalytic exchange reactor only. In other words, exchange catalyst alone may be used in the low temperature reactor, and a mixture of catalyst and fissionable material in the high temperature reactor. According to this modification, and using FIG. 1 to illustrate, the flow may be as shown in FIG. 1 except that the upward pass of the feed water in coil 13 of zone 14 is omitted. The feed in line 12 does not enter the reactor 14 but instead is passed directly to the mixing zone 18. Also, the fissionable material in the high temperature reactor may be present in subcritical amounts, as in FIG. 1, or in critical amounts or above critical amounts as in FIG. 2. It will be understood that fissionable material may be omitted from the low temperature reactor of FIGS. 2 and 3 as well as of FIG. 1.

It is also possible to operate the so-called simple or single temperature steam-hydrogen exchange reaction and to obtain at least some of the benefits of the invention. In this reaction, deuterium is transferred from the hydrogen to the steam. The reaction may be operated at, say, about 100° C., where the equilibrium constant of the equation noted above is about 2.69. The catalyst may be chosen from those already described and may be used with either a sub-critical or critical or above critical amount of fissionable material. Feed water at the proper temperature may be passed upwardly through a coil or tube in the reactor wherein fission is taking place, thereby exposing the feed to neutron capture, then the feed is mixture with hydrogen in a mixing zone such as zone 18, and the mixture is passed back through the contact mass. The effluent from the reactor is removed, used to preheat additional feed, and then separated into a lean hydrogen gas fraction and an enriched water fraction which is recovered. The method is applicable to the flows of FIGS. 2 and 3 as well as of FIG. 1. In FIG. 2, only zone 54 and its separator 66 would be retained, zone 74 and separator 86 being omitted. In FIG. 3, mixing zone 109, zone 111, heat exchangers 103 and 104, pump 112, and separator 113 would be retained, including tube or tubes 108 and the so-called power loop 97-98-99-100-101. The high temperature zone, comprising tubes 121 and 122, mixing zone 115, pump 123, heat exchanger 119, and separator 124 would be omitted.

Cascade or multistage operation may be employed with the single temperature reaction to increase the recovery of deuterium.

It will be understood that the invention is capable of obvious variations without departing from its scope.

In the light of the foregoing descriptions, the following is claimed:

1. In a dual-temperature steam-hydrogen catalytic exchange process for making heavy water wherein a continuously recirculating supply of hydrogen is made to transfer a portion of its deuterium content to steam in a low temperature zone and then to replenish its deuterium content by transfer from fresh steam in a high temperature zone, and wherein the enriched steam is condensed and recovered, the improvement comprising arranging a bed comprising a mixture of exchange catalyst and fissionable material in said low temperature zone, subjecting the bed to a neutron flux to induce fission of the fissionable material, thereby producing energy in the form of heat, fission fragments, additional neutrons, and enhancing the activity of said catalyst by means of such energy, passing feed water through said bed in indirect heat exchange to preheat and vaporize the water by means of said heat, said water and resulting steam becoming richer in deuterium by capture of neutrons, collecting and mixing said steam with hydrogen and passing the resulting gaseous mixture through the bed in direct contact therewith, thereby transferring deuterium from the hydrogen to the steam in the presence of said catalyst, said mixture during said last pass becoming enriched in deuterium by neutron capture, removing the mixture and condensing the steam to form a deuterium-enriched water fraction and a lean hydrogen fraction, recovering the former; arranging in said high temperature zone a bed of exchange catalyst and fissionable material and subjecting the same to a neutron flux to induce fission with the resulting production of energy as in said low temperature zone, flowing feed water through the bed in indirect heat exchange to form steam while coincidently enriching both the water and steam in deuterium by neutron capture, then collecting and mixing the steam with said lean hydrogen fraction, flowing the resulting gaseous mixture through the bed in direct contact therewith to transfer deuterium from the steam to the hydrogen in the presence of said catalyst, said mixture becoming enriched in deuterium by neutron capture, removing the mixture from the high temperature zone and condensing the steam to form a deuterium-enriched hydrogen fraction, and recirculating the latter to the low temperature zone.

2. In a dual-temperature steam-hydrogen catalytic exchange process for making heavy water wherein a continuously recirculating supply of hydrogen is employed and a portion of its deuterium content is transferred to steam in a low temperature catalytic zone and deuterium is then transferred to the deuterium-depleted hydrogen from fresh steam in a high temperature catalytic zone, and wherein the enriched steam is condensed and recovered, the improvement comprising arranging a bed comprising a mixture of exchange catalyst and fissionable material in said low temperature zone, subjecting the bed to a neutron flux to induce fission of the fissionable material, thereby producing energy, including additional neutrons, and enhancing the activity of said catalyst by means of such energy, passing a mixture of steam and hydrogen through said bed to transfer deuterium from the hydrogen to the steam in the presence of said catalyst, said steam and hydrogen also becoming richer in deuterium by capture of neutrons, removing the mixture from said zone and condensing the steam to form a deuterium-enriched water fraction and a lean hydrogen fraction, recovering the water fraction; arranging in said high temperature zone a bed of exchange catalyst and fissionable material and subjecting the same to a neutron flux to induce fission, thereby enhancing the activity of the catalyst and producing additional neutrons, passing a mixture of fresh steam and said lean hydrogen fraction through said last-mentioned bed to transfer deuterium from the steam to the hydrogen in the presence of the catalyst, said fresh steam and lean hydrogen coincidently becoming enriched in deuterium by neutron capture during said last pass, removing the mixture from the high temperature zone and condensing the steam to form a deuterium-enriched hydrogen fraction, and recirculating the latter to the low temperature zone as the source of the hydrogen therein.

3. In a dual-temperature steam-hydrogen catalytic exchange process for making heavy water wherein a continuously recirculating supply of hydrogen is employed and a portion of its deuterium content is transferred to steam in a low temperature catalytic zone, deuterium is then transferred to the deuterium-depleted hydrogen from fresh steam in a high temperature catalytic zone, and the latter enriched hydrogen is reused in the low temperature zone, and wherein the enriched steam is condensed and recovered, the improvement comprising arranging in each zone a mixture of catalyst and fissionable material, inducing fission of the fissionable material, thereby producing energy and enhancing the activity of catalyst by means of such energy, and carrying out said deuterium transfer reactions in said zones during the progress of said fission reactions.

4. In a dual-temperature steam-hydrogen catalytic exchange process for making heavy water wherein a continuously recirculating supply of hydrogen is employed and a portion of its deuterium content is transferred to steam in a low temperature catalytic zone and deuterium is then transferred to the deuterium-depleted hydrogen from fresh steam in a high temperature catalytic zone, and the latter enriched hydrogen is reused in the low temperature zone, and wherein the enriched steam is condensed and recovered, the improvement comprising increasing the deuterium content of the steam-hydrogen reaction mixture in each zone by subjecting each reaction mixture to a neutron flux during said deuterium transfer reactions, thereby increasing the deuterium content of the hydrogen and steam by neutron capture and enabling steam of higher deuterium content to be recovered in the low temperature zone and hydrogen of higher deuterium content to be formed in the high temperature zone.

5. The process of claim 4 wherein each zone contains fissionable material admixed with catalyst, and said neutron flux is provided by fission of said fissionable material.

6. In a dual-temperature steam-hydrogen catalytic exchange process for making heavy water wherein a continuously recirculating supply of hydrogen is employed to transfer deuterium to steam in a low temperature catalytic zone and deuterium is transferred from fresh steam to said hydrogen in a high temperature catalytic zone, and wherein the enriched steam is condensed and recovered, the improvement comprising aranging in each said zone a mixture of catalyst and fissionable material, inducing fission of the fissionable material in each zone, thereby producing energy, including heat and neutrons, and enhancing the activity of said catalyst, maintaining a flowing body of water around each zone to serve as a neutron-absorbing blanket therefor and coincidently increasing the deuterium content of the water by neutron capture, passing water from the blanket through each said zone in indirect heat exchange therewith to preheat and vaporize the water by means of said fission heat, collecting resulting steam and mixing the same with hydrogen, then passing the resulting gaseous mixture through each zone in direct heat exchange therewith, thereby in the low temperature zone transferring deuterium from the hydrogen to the steam and in the high temperature zone transferring deuterium from the steam to the hydrogen, removing the gaseous reaction mixture from each zone and condensing the steam therein, forming from the low temperature zone effluent a deuterium-enriched water fraction and a lean hydrogen fraction, recovering the former, passing the latter to the high temperature zone to form the hydrogen supply thereto, forming from the high temperature zone effluent a deuterium-enriched hydrogen fraction and passing the same to the low temperature zone to form the hydrogen supply thereto.

7. In a dual-temperature steam-hydrogen catalytic exchange process for making heavy water wherein a continuously recirculating supply of hydrogen is employed to transfer deuterium to steam in a low temperature catalytic zone and deuterium is transferred from fresh steam to said hydrogen in a high temperature catalytic zone, and wherein the enriched steam is condensed and recovered, the improvement comprising arranging in each said zone a mixture of catalyst and fissionable material, inducing fission of the fissionable material in each zone, thereby producing energy, including heat and neutrons, and enhancing the activity of said catalyst, maintaining water around each zone to serve as a neutron-absorbing blanket therefor and coincidently increasing the deuterium content of the water by neutron capture, passing water from the blanket through each said zone in indirect heat exchange therewith to preheat and vaporize the water by means of said fission heat and to further increase the deuterium content of the water by neutron capture, collecting resulting steam and mixing the same with hydrogen, then passing the resulting gaseous mixture through each zone in direct heat exchange therewith, thereby in the low temperature zone transferring deuterium from the hydrogen to the steam and in the high temperature zone transferring deuterium from the steam to the hydrogen, said last-mentioned pass further increasing the deuterium content of the steam and also of the hydrogen by neutron capture, removing the gaseous reaction mixture from each zone and condensing the steam therein, forming from the low temperature zone effluent a deuterium-enriched water fraction and a lean hydrogen fraction, recovering the former, passing the latter to the high temperature zone to form the hydrogen supply thereto, forming from the high temperature zone effluent a deterium-enriched hydrogen fraction and passing the same to the low temperature zone to form the hydrogen supply thereto.

8. In a dual-temperature steam-hydrogen catalytic exchange process for making heavy water wherein a continuously recirculating supply of hydrogen is employed to transfer deuterium to steam in a low temperature catalytic zone and deuterium is transferred from fresh steam to the deuterium-depleted hydrogen in a high temperature catalytic zone, and wherein the enriched steam is condensed and recovered, the improvement comprising passing a gaseous mixture of steam and hydrogen through the catalyst in the low temperature zone to transfer deuterium from the hydrogen to the steam, removing the gaseous mixture from said zone and condensing the steam to form a deuterium-enriched water fraction and a lean hydrogen fraction, arranging in said high temperature zone a bed of fissionable material and said catalyst and subjecting the same to a neutron flux to induce fission of the fissionable material, thereby producing energy, including heat and additional neutrons, and enhancing the activity of said catalyst by means of such energy, passing feed water through said bed in indirect heat exchange therewith to preheat and vaporize the water by means of said heat while coincidently enriching both the water and steam in deuterium by neutron capture, then collecting the steam and mixing the same with said lean hydrogen fraction from the low temperature zone, passing the resulting gaseous mixture through said bed in direct contact therewith to transfer deuterium from the steam to the hydrogen, both the steam and hydrogen during said last pass becoming enriched in deuterium by neutron capture, removing the gaseous mixture from said high temperature zone and condensing the steam to form a deuterium-enriched hydrogen fraction, recirculating the latter to the low temperature zone to form the hydrogen supply thereto, and recovering the deuterium-enriched water fraction from the said low temperature zone.

9. In a steam-hydrogen catalytic exchange process for making heavy water wherein a supply of hydrogen is employed to transfer deuterium to steam in a catalytic zone and wherein the enriched steam is condensed and recovered, the improvement comprising arranging in said zone a bed comprising a mixture of catalyst and fissionable material, inducing fission of the fissionable material, thereby producing energy, including heat and neutrons, and enhancing the activity of said catalyst, passing water through said bed in indirect heat exchange therewith to preheat and vaporize the water by means of said heat while coincidently enriching both the water and resulting steam in deuterium by neutron capture, then collecting resulting steam and mixing the same with hydrogen, passing the resulting gaseous mixture through the bed in direct contact therewith, thereby transferring deuterium from the hydrogen to the steam, both the steam and hydrogen becoming enriched in deuterium by neutron capture, removing the gaseous mixture and condensing the steam to form a deuterium-enriched water fraction.

10. In a dual-temperature steam-hydrogen catalytic exchange process for making heavy water wherein a portion of the deuterium content of hydrogen is transferred to steam in a low temperature catalytic zone, deuterium is then transferred to the deuterium-depleted hydrogen from fresh steam in a high temperature catalytic zone, and the resulting enriched hydrogen is reused in the low temperature zone, and wherein the enriched steam is condensed and recovered, the improvement comprising disposing in each zone a mixture of catalyst and fissionable material, disposing the high temperature zone in the core of a nuclear power reactor and the low temperature zone adjacent said core, operating said nuclear reactor and cooling the core thereof by means of a continuously circulating closed stream of water coolant whereby said coolant absorbs heat from the core and transfers the same to a working fluid outside the core, said coolant absorbing neutrons in the reactor core and thus becoming enriched in deuterium by neutron capture, using portions of said closed stream of water coolant for the feed steam for both the low and high temperature zones, inducing fission of the fissionable material in said zones by means of the neutron flux from said core, thereby producing in said zones energy in the form of heat, fission fragments, additional neutrons, and enhancing the activity of said catalyst by means of such energy, coincidently therewith increasing the deuterium content of the hydrogen and steam in both zones by neutron capture from said additional neutrons and said neutron flux, and thereby enabling steam of high deuterium content to be recovered from the low temperature zone and hydrogen of high deuterium content to be formed in the high temperature zone.

11. In a steam-hydrogen catalytic exchange process for making heavy water wherein deuterium is transferred to steam from hydrogen in a catalytic zone and the enriched steam is condensed and recovered, the improvement comprising disposing in said zone a mixture of catalyst and fissionable material, disposing the zone in a nuclear power reactor, operating said nuclear reactor and cooling the same by means of a continuously circulating closed stream of water coolant whereby said coolant absorbs heat from the reactor and transfers the same to a working fluid outside the reactor, said coolant absorbing neutrons in the reactor and thus becoming enriched in deuterium by neutron capture, using a portion of said closed stream of water coolant for the feed steam for said zone, inducing fission of the fissionable material in said zone by means of the neutron flux from said reactor, thereby producing energy in the form of heat, fission fragments, additional neutrons, an enhancing the activity of said catalyst by means of such energy, coincidently therewith increasing the deuterium content of the hydrogen and steam in said zone by neutron capture from said additional neutrons and said neutron flux, and thereby enabling steam of high deuterium content to be recovered from said zone.

References Cited by the Examiner

UNITED STATES PATENTS

| 2,676,875 | 4/54 | Barr | 23—288 |
| 3,051,737 | 8/62 | Gibson | 204—154 |
| 3,065,159 | 11/62 | Conner | 176—14 |

OTHER REFERENCES

Becker: Heavy Water Production, pp. 43–45; Review Series, No. 21, International Atomic Energy Agency, Vienna, 1962.

Cerrai et al.: "A Thermal Method for Concentrating Heavy Water," Nuclear Engineering, Part I, pp. 271–280, No. 11, vol. 50, 1954.

Glasstone: Principles of Nuclear Reactor Engineering, paragraphs 8.131–8.139; D. Van Nostrand Co., Inc., Princeton, N.J., 1955.

REUBEN EPSTEIN, *Primary Examiner.*

CARL D. QUARFORTH, *Examiner.*